Sept. 12, 1961 E. R. EVANS 2,999,565
DISK BRAKE
Filed March 7, 1956 5 Sheets-Sheet 2
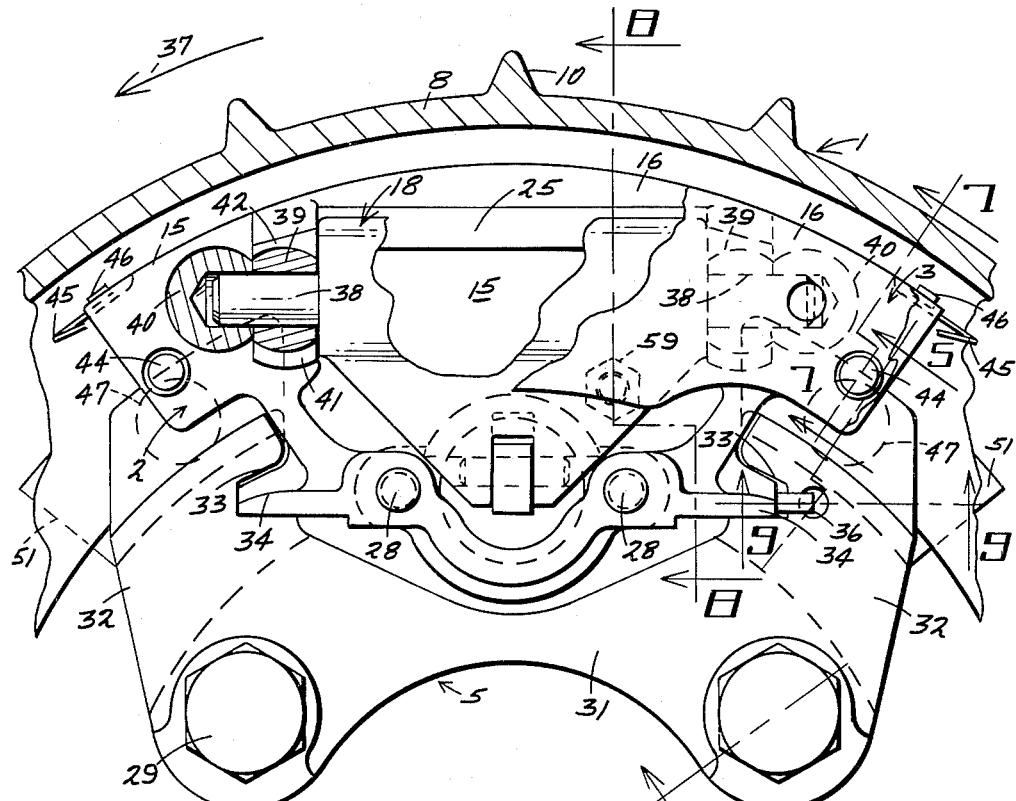
Fig.2
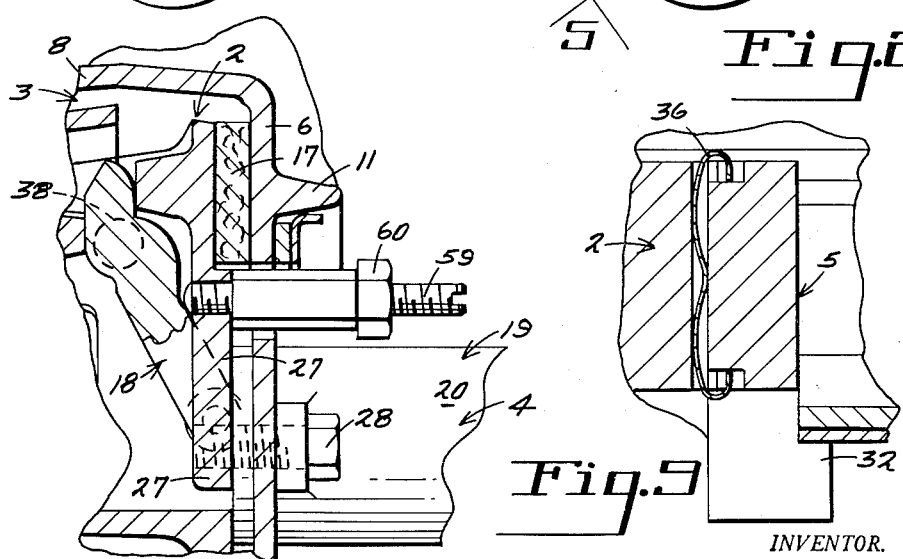
Fig.8
Fig.9
INVENTOR.
EDWIN R. EVANS.

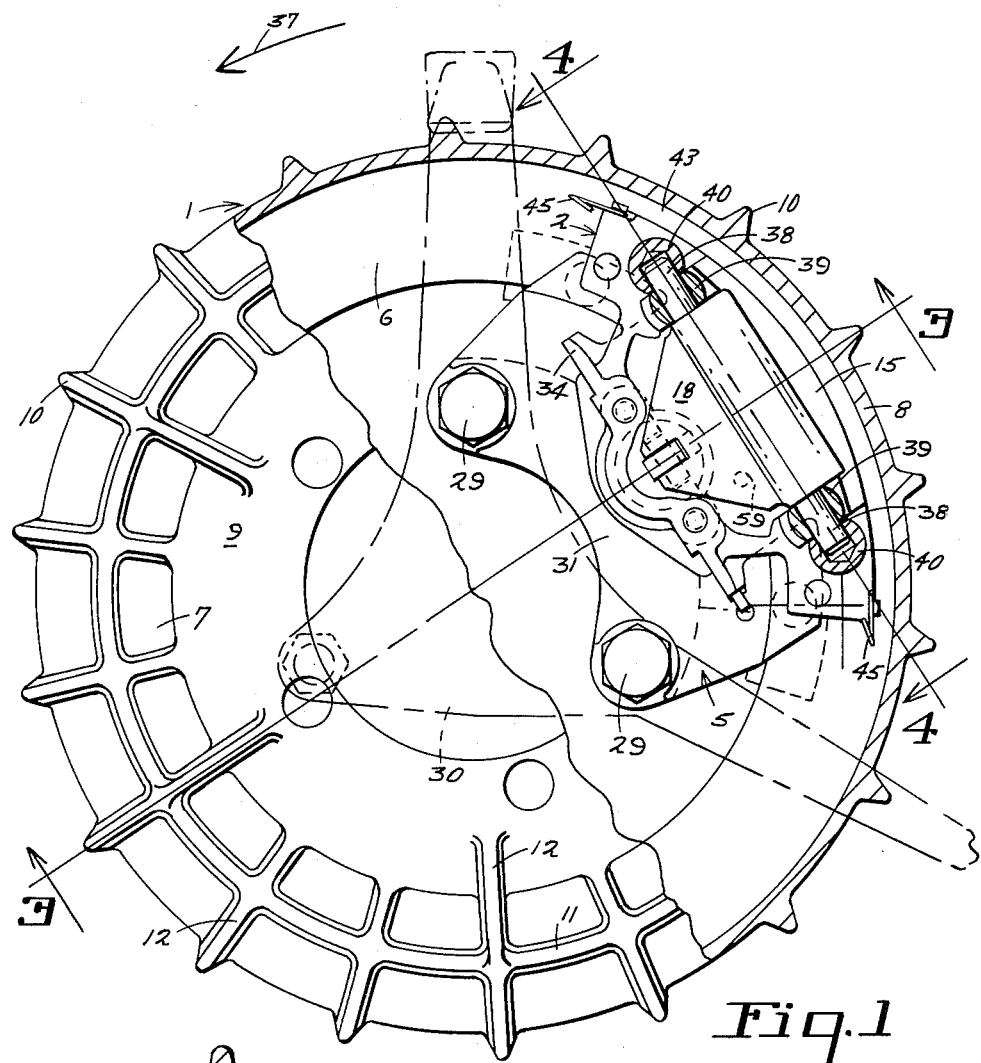
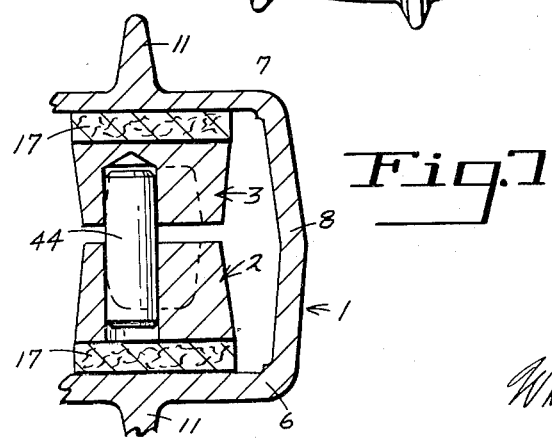
Fig.1
Fig.7
INVENTOR.
EDWIN R. EVANS.

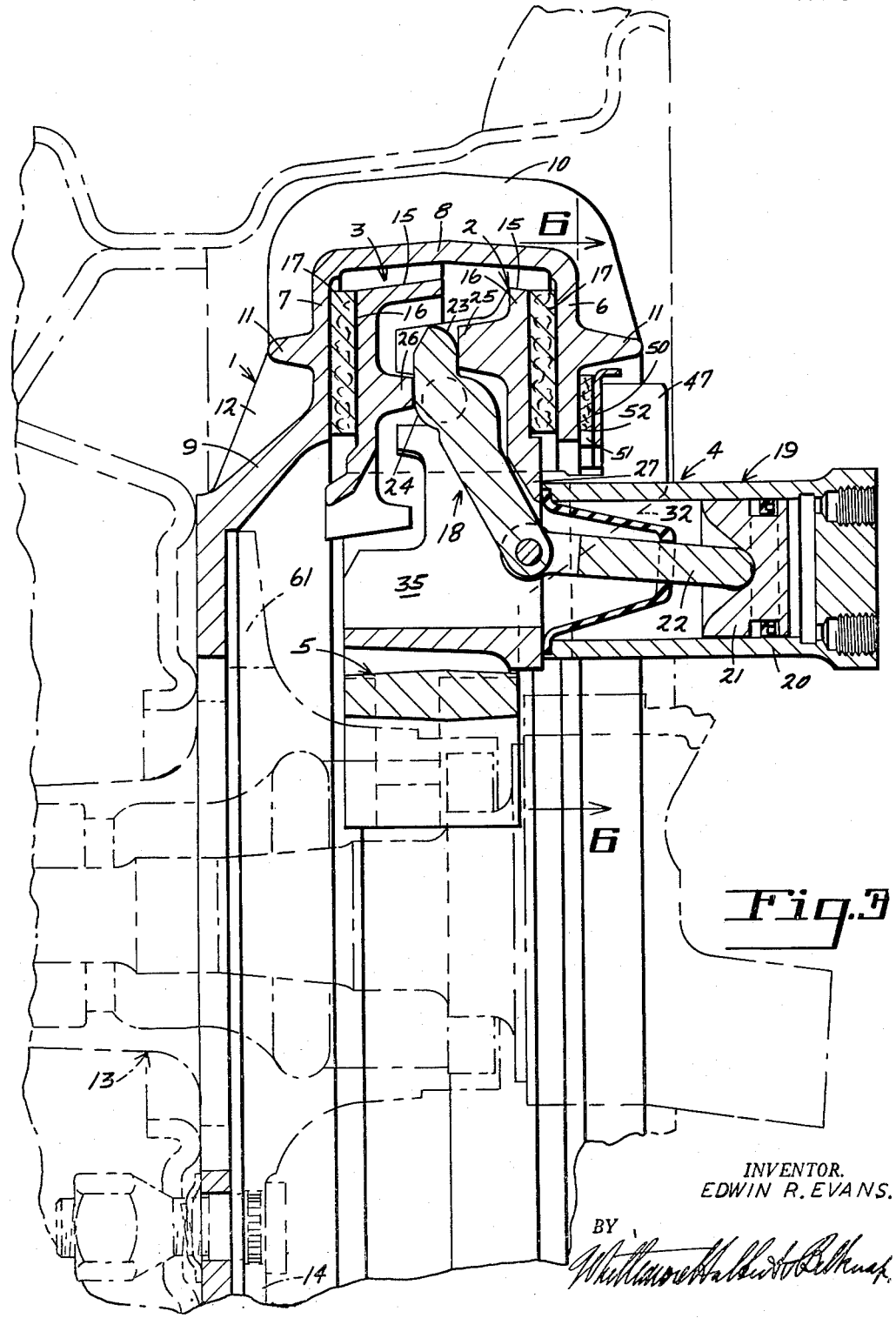

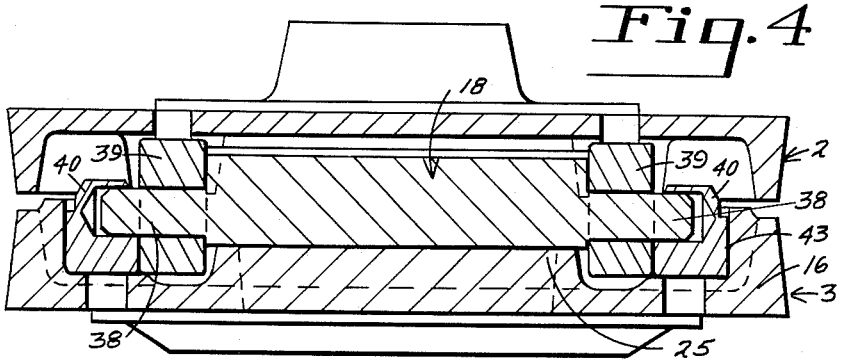
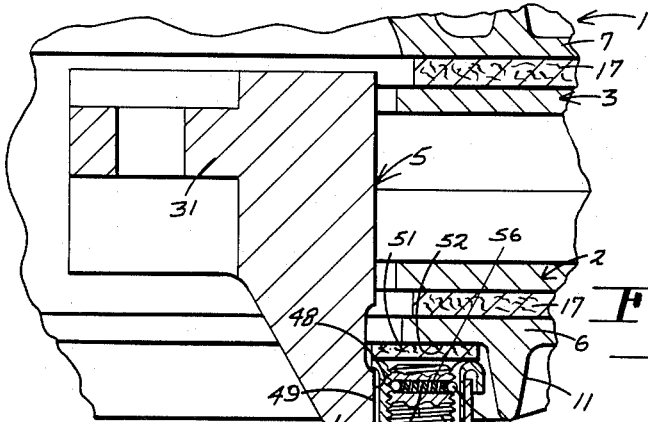
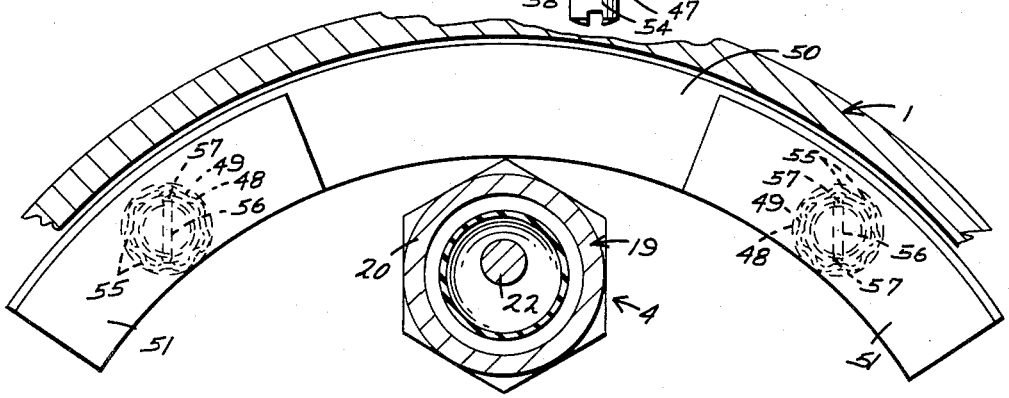

Sept. 12, 1961  E. R. EVANS  2,999,565
DISK BRAKE
Filed March 7, 1956  5 Sheets-Sheet 5

INVENTOR.
EDWIN R. EVANS.
BY
Whittemore Hulbert & Belknap.

United States Patent Office 2,999,565
Patented Sept. 12, 1961

2,999,565
DISK BRAKE
Edwin R. Evans, 3215 W. Shore Drive,
Orchard Lake, Mich.
Filed Mar. 7, 1956, Ser. No. 570,064
4 Claims. (Cl. 188—72)

The invention relates to disk brakes and refers more particularly to disk brakes for use with motor vehicle wheels.

The invention has for one of its objects to provide an efficient disk brake, the parts of which are simple in construction and may be cheaply manufactured.

The invention has for another object to provide a disk brake, the parts of which may be readily assembled.

The invention has for still other objects to provide a disk brake comprising a rotatable member, a pair of brake elements engageable with axially spaced disks of the rotatable member and a single anchor for the brake elements; to provide a disk brake in which one brake element is mounted on the anchor and the other of the brake elements is mounted on the first brake element; to provide means for moving the brake elements into engagement with the disks comprising a lever, a fluid pressure cylinder and a piston within the cylinder for moving the lever, the lever and cylinder acting on one brake element and the lever alone acting on the other brake element to move these brake elements away from each other and into engagement with the disks; to provide a disk brake in which the brake elements, lever and anchor are formed to hold the parts from radial movement as well as circumferential movement; and to provide a disk brake in which flexing of the rotatable member upon frictional engagement of its disks by the brake elements is limited to thereby provide for decreasing the weight of the rotatable member without increasing the risk of damaging the rotatable member.

The invention has for further objects to utilize the means for limiting the flexing of the rotatable member as an additional brake element; to so arrange the means for limiting the flexing that it, in effect, forms with the disks and brake elements a triple disk brake; to mount the means for limiting the flexing on the anchor for the brake elements; and to provide a simple self-locking and measuring adjustment means for the means for limiting the flexing.

With these as well as other objects in view, the invention resides in the novel features of construction and combinations and arrangements of parts as more fully hereinafter set forth.

FIGURE 1 is an outboard elevation partly broken away and in section of a brake embodying the invention;

FIGURE 2 is an enlarged view similar to FIGURE 1;

Figure 10:
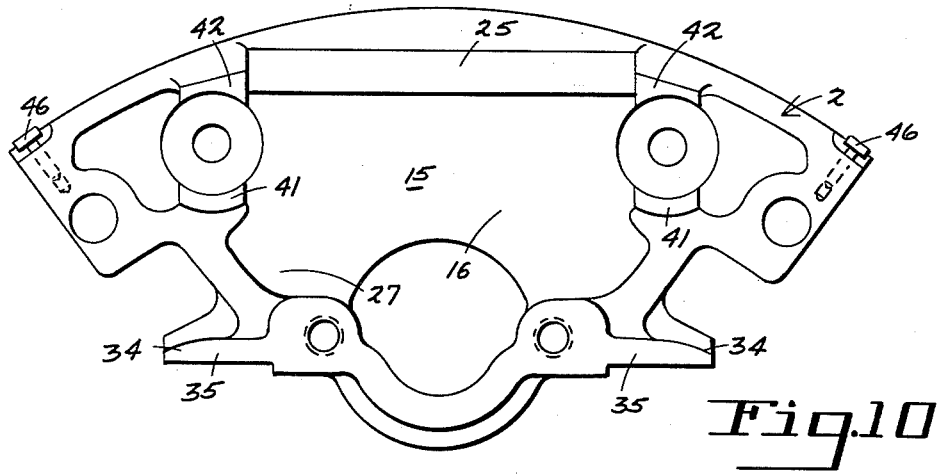
Figure 11:
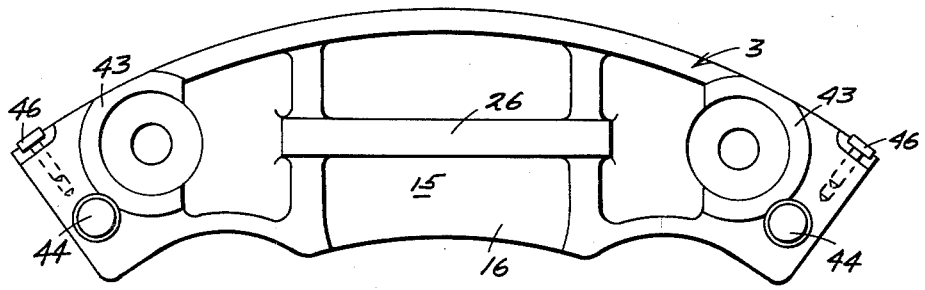
Figure 12:
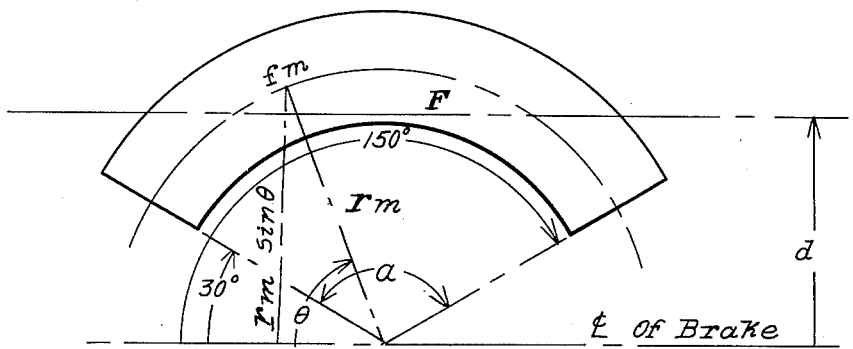

FIGURES 3 and 4 are enlarged cross sections on the lines 3—3 and 4—4 respectively of FIGURE 1;

FIGURES 5, 7, 8 and 9 are cross sections on the lines 5—5, 7—7, 8—8 and 9—9 respectively of FIGURE 2;

FIGURE 6 is a cross section on the line 6—6 of FIGURE 3;

FIGURES 10 and 11 are elevations of opposed surfaces of the inner and outer brake elements respectively;

FIGURE 12 is a diagrammatic view illustrating the method of securing the locus on the lining of a brake element on which the brake applying forces are exerted to assure uniform wear of the lining.

The brake illustrated in FIGURES 1 to 12 inclusive is a disk brake for use with a front wheel of a motor vehicle.

The disk brake comprises the rotatable member 1, the inner and outer brake elements 2 and 3, respectively the actuating mechanism 4 for moving the brake elements into engagement with the rotatable member and the anchor 5 for the brake elements.

The rotatable member 1 is a one-piece radially inwardly opening brake drum having the axially spaced inner and outer disks 6 and 7, respectively, providing opposed brake surfaces for the brake elements, the peripheral portion 8 connecting the disks and the web 9 extending generally radially inwardly from the outer disk 7. The brake drum is reinforced by the ribs 10 having axial portions extending radially outwardly from the peripheral portion 8 and radial portions extending axially inwardly and outwardly from the disks 6 and 7 respectively. The brake drum is also reinforced by the annular ribs 11 extending axially inwardly and outwardly from the disks 6 and 7, respectively, and further reinforced by the radial ribs 12 extending axially outwardly from the radially outer portion of the web 9. The brake drum is detachably mounted on a front wheel hub 13 of the motor vehicle by suitably mounting and securing the web 9 on the fixed flange 14 of the wheel hub in a conventional manner.

The inner and outer brake elements 2 and 3, respectively, are friction members which extend within the brake drum between the inner and outer disks 6 and 7 respectively and are engageable with their respective brake surfaces. The inner and outer brake elements have the bodies 15 which are formed with the coextensive generally arcuate portions 16 providing flat surfaces to which are secured the arcuate linings 17 for engaging the brake surfaces of the disks 6 and 7. The arcuate portions and linings are sectors and extend circumferentially of the disks a relatively short distance so that the brake elements are brake shoes.

The actuating mechanism 4 for axially moving the brake shoes away from each other and into frictional engagement with the disks comprises the lever 18 and the fluid pressure operated actuator 19 having the hydraulic cylinder 20, the piston 21, and the piston rod 22. The lever is a plate, preferably formed of steel, extending between the brake shoes 2 and 3 and pivotally connected at its radially inner end to the piston rod 22. The lever has the cam surfaces 23 and 24 for engaging the reinforcing ribs 25 and 26 of the inner and outer brake shoes 2 and 3 respectively when forcing the brake shoes against their respectively disks. The ribs 25 and 26 extend chordwise of the body portions 16 and are integral with the inner and outer brake shoes respectively, the rib 25 being located radially outwardly of the rib 26. The body 15 of the inner brake shoe 2 also has the central portion 27 which extends radially inwardly from the arcuate portion 16 and carries the actuator 19. As shown, the hydraulic cylinder 20 of the actuator is secured by suitable bolts 28 to the central portion and extends axially inwardly through the central opening in the inner disk 6. The piston 21 has a recessed end providing a partly spherical seat for the piston rod 22.

The ribs 25 and 26 extend throughout the major chordwise extent of the bodies 16 and the cam surfaces 23 and 24 extend throughout the width of the lever 18 and are coextensive with the ribs so that the ribs and cam surfaces have extended linear contact. Both the inner and outer brake shoes and the lever are constructed to have great rigidity and the lever serves to increase the rigidity of the shoes so that the brake shoes may be formed of cast iron. The arrangement is such as to provide the maximum lining pressure with the minimum of strain in the assembly and to provide a much desired saving in fluid displacement. Also, surface hardening of the contacting surfaces is unnecessary as proven by the fact that no appreciable wear at the contacting surfaces was found after many thousands of brake applications.

The actuating mechanism presents a closed system in which the hydraulic cylinder 20 and the lever 18, upon entrance of fluid under pressure into the hydraulic cylinder, exerts force in an inboard or axially inner direction upon the central and radially outer arcuate portions 27 and 16 respectively of the inner brake shoe 2 and the lever exerts force in an outboard or axially outer direction upon the outer brake shoe 3 between the radially inner end of the lever and the line of contact of the lever upon the inner brake shoe. Therefore, with a 3 to 1 lever ratio, the effort exerted upon each of the brake shoes forcing the same away from each other and against the disks is four times the pressure exerted by the fluid in the hydraulic cylinder. Furthermore, the pressure exerted upon the outer brake shoe is along the chordal line presented by the rib 26 and the pressure exerted upon the inner brake shoe is equal to and opposite that exerted upon the chordal line of the outer brake shoe.

Wear of the lining is a product of pressure times velocity and, for the purpose of equally distributing the lining wear, the line of contact between the rib 26 and the lever 18 must be located so that the product of pressure ($P_1$) and velocity ($V_1$) at one radial side of the line equals the product of pressure ($P_2$) and velocity ($V_2$) at the other radial side of the line, or $P_1V_1=P_2V_2$.

In order to secure this result, the location of the line of contact and, consequently, the location of the chordal rib of the outer brake shoe can be secured by developing a formula as follows:

Given: The inner and outer radii of the lining and the included angle which the lining subtends.
Symbols used:
  T—torque, lb. in.
  $F_f$—friction force, lb.
  $F_a$—axial force, lb.
  $r_m$—mean radius, in.
  $f$—coefficient of friction
  $r_i$—inner radius of lining, in.
  $r_o$—outer radius of lining, in.
  $p$—unit pressure, p.s.i.
  V—velocity of rubbing
  K—constant
  C—constant In order that all of the surface will remain in contact the wear in the axial direction must be the same for all values of $r$. Wear is proportional to the work done by friction, which is in turn proportional to the product of the normal pressure and the velocity of rubbing.

Therefore: $W=\text{wear}=Kpv=Kpr$ since the rubbing velocity varies as the radius, $r$.
Then:

$$p=\frac{W}{Kr}=\frac{C}{r}$$

where C is a constant, since W and K are constants.

$$T=F_fr_m=fF_ar_m=\int_{r_i}^{r_o}\frac{2\pi}{3}fpr^2dr$$

Substituting $p$ for its value $$\frac{C}{r}$$

$$T=\frac{2\pi fC}{3}\int_{r_i}^{r_o}rdr=\frac{2\pi fC}{3}\frac{(r_o^2-r_i^2)}{2}$$

The total axial force, $$F_a=\frac{2\pi}{3}\int_{r_i}^{r_o}prdr=\frac{2\pi C}{3}\int_{r_i}^{r_o}dr$$

$$=\frac{2\pi C}{3}(r_o-r_i)$$

But:

$$r_m=\frac{T}{fF_a}=\frac{\frac{2\pi fC}{3}\frac{(r_o^2-r_i^2)}{2}}{\frac{f2\pi C}{3}(r_o-r_i)}=\frac{r_o^2-r_i^2}{2(r_o-r_i)}=\frac{r_o+r_i}{2}$$

The location of the mean radius is simply one half the sum of the inner and outer radii. This means that if the lever forces can be distributed along the mean radius, uniform wear will result taking into account the increased rubbing velocity toward the outer periphery of the lining. The angle subtended by the circular segment does not affect the mean radius.

Referring to FIGURE 12 of the drawings:
Assume a force, F, which when applied at a distance $d$ will be distributed along the mean radius, $r_m$.

$$f_m=\frac{\text{force}}{\text{radian}} \text{ and, } \frac{f_m 2\pi}{3}=F$$

Taking moments about the center $$Fd=\int_{\frac{\pi}{6}}^{\frac{5\pi}{6}}f_mr_m \sin\theta d\theta=f_mr_m\left(-\cos\frac{5\pi}{6}-\cos\frac{\pi}{6}\right)$$

$$Fd=f_mr_m\sqrt{3}=\frac{3F\sqrt{3}r_m}{2\pi}$$

Or $$d=\frac{3\sqrt{3}r_m}{2\pi}$$

for a 120° circular segment.

The locus upon which the lever forces may be applied so as to insure uniform wear upon a circular segment is, therefore, the centroidal axis of the mean radius, $r_m$, which is a circular arc.

The centroidal axis for any circular arc is given by the formula:

$$d=\frac{R\sin\frac{1}{2}\alpha}{\frac{1}{2}\alpha \text{ in radians}}$$

where:
$d$=the distance between the centroidal axis and the center of the circular arc.
$R$=radius of the circular arc.
$\alpha$=angle subtended by the circular arc.

For any circular segment the locus upon which the lever forces may be applied so as to assure uniform wear is:

$$d=\frac{r_m\sin\frac{1}{2}\alpha}{\frac{1}{2}\alpha \text{ in radians}}$$

where $$r_m=\frac{r_o+r_i}{2}$$

The anchor 5 is a bracket secured, as by means of the bolts 29 to the flange 30 of a conventional front wheel spindle. The anchor bracket serves as a mounting for the inner brake shoe 2 and limits circumferential movement and radial movement but provides for axial movement of this brake shoe. More in detail, the anchor bracket has the body 31 provided with the circumferentially spaced arms 32. The arms are formed with the transverse grooves 33 opening toward each other in a direction chordwise of the brake and these grooves are slidably engaged by the axially extending end extensions 34 on the transverse reinforcing flange 35 of the central portion 27 of the inner brake shoe. The extensions extend in opposite directions and chordwise of the brake. To prevent rattle between the inner brake shoe and the anchor bracket, the bowed spring 36 is provided between the bottom of the groove and the associated extension facing in a direction opposite the forward direction of rotation of the brake drum as indicated by the arrow 37 in FIGURES 1 and 2. The ends of the spring are return-bent and engage recesses in the sides of the anchor bracket. The arms and end extension are of material width axially of the brake so that the anchor bracket serves to hold the inner brake shoe from twisting in the brake drum. Also, the construction is such that the bottoms and overhanging parts of the grooves respectively serve to limit circumferential and radial movement of the inner brake shoe.

The lever 18 has the axially aligned pintels 38 at its edges which are journaled in the pair of bearings 39 and the pair of bearings 40. The bearings 39 have radially inner and outer arcuate surfaces of the same radii axially slidably engaging corresponding surfaces of the radially inner and outer flanges 41 and 42 respectively which extend transversely of the body portion 16 of the inner brake shoe 2. The bearings 40 have arcuate surfaces axially slidably engaging arcuate surfaces of the semicircular flanges 43 which extend transversely of the body portion 16 of the outer brake shoe 3 and face or open toward each other. The bearings 39 and 40 are preferably formed from cylindrical rods fashioned to provide flat sides and the bearings are arranged so that the flat sides of the bearings 39 abut the edges of the lever 18 and the flat sides of the bearings 40. The bearings 39 are held from circumferential and radial movement by the transverse flanges 41 and 42. The bearings 40 are held from circumferential and radial movement by the transverse flanges 43. The construction is such that the inner brake shoe 2 supports and holds the lever 18 from circumferential and radial movement and the lever 18 in turn supports and holds the outer brake shoe 3 from circumferential and radial movement and serves to spread apart the two brake shoes.

I have also provided the axially extending pins 44 at the ends of the body portions 16 of the brake shoes for assisting in supporting the outer brake shoe 3 on the inner brake shoe 2 and assuring parallel positioning of the outer brake shoe relative to the inner brake shoe during non-braking periods. As shown in FIGURE 7, the pins have a press fit with the body portion of the outer brake shoe and a sliding fit with the body portion of the inner brake shoe.

The two brake shoes 2 and 3 are resiliently urged toward each other and normally held in retracted position by the generally U-shaped wire springs 45 located in recesses in the opposed or facing radially outer corners of the bodies 15 near their end portions. The springs 45 are held in the recesses by the headed projections 46 which in the present instance are headed pins secured to the bodies, the arrangement providing for easy assembly of the springs.

For the purpose of limiting the flexing of the brake drum 1 when the brake shoes 2 and 3 are spread apart and into frictional engagement with the disks 6 and 7 with sufficient force to flex the brake drum, an abutment is provided for engaging the inboard or axially inner side of the inner disk 6. In detail, the anchor bracket 5 has its arms 32 extended axially through the central opening of the inner disk 6 and provided with the integral radially outwardly extending projections 47 formed with the axially outwardly opening cylindrical recesses 48. These recesses receive the cylindrical bosses 49 upon the arcuate stamped backing 50 to which are secured the lining sectors 51 for engaging the surface 52 on the axially inner side of the inner disk 6. The lining sectors, in addition to being operable to limit the flexing of the brake drum, also frictionally engage the inner surface 52 of the inner disk and serve in applying extra braking force to the brake drum when the brake shoes 2 and 3 are forced against the disks 6 and 7 with sufficient force to flex the brake drum. The rib 11 on the axially inner side of the disk 6 encircles the backing 50 and the lining sectors 51 and assists in protecting these parts from dirt and the like.

To axially adjust the lining sectors 51 to provide a predetermined clearance between these sectors and the surface 52, the bosses 49 are internally threaded and engaged by the screws 53 having the stems 54 extending through the bottoms of the recesses 48. The bosses 49 are formed with an odd number of axial corrugations 55 and the screws are formed with the diametral passages 56 in the ends of each of which are the balls 57 resiliently urged outwardly by the coil springs 58. During the turning of the screws, the balls of each screw alternately engage the corrugations and serve to indicate a predetermined increment of adjustment. In other words, the balls and corrugations serve to measure the adjustment of the screws.

To manually adjust the inner and outer brake shoes 2 and 3 with respect to the disks 6 and 7, I have provided the adjustment screw 59 which extends axially through the central opening of the inner disk 6 and threadedly engages the central portion 27 of the inner brake shoe and abuts the lever 18. 60 is a lock nut threaded on the screw and abutting the central portion of the inner brake shoe. Both the screw and nut extend axially inwardly a sufficient distance to be readily turned manually.

With the above construction, the various parts of the brake are simple and many be economically manufactured and also may be readily assembled. During the assembling operation, the anchor bracket 5 is bolted on the flange 30 of the front wheel spindle after which the wheel hub 13 is assembled on the assembly. Also, the hydraulic cylinder 20 is bolted to the inner brake shoe 2 and the inner brake shoe with the hydraulic cylinder in place, the outer brake shoe 3, the pairs of bearings 39 and 40 and the lever 18 connected to the piston rod 22, which bears on the piston 21, are assembled and then secured together by the springs 45 to form a unit. This unit is then inserted within the brake drum 1 with the brake shoes extending between the disks 6 and 7, after which the brake drum with the unit is mounted in place by passing the hydraulic cylinder and the radially inner central portion of the inner brake shoe through the notch 61 of the fixed flange 14 of the wheel hub and through the space between the arms 32 of the anchor bracket 5 and by engaging the extensions 34 of the inner brake shoe with the grooves 33 of the anchor bracket. The brake drum may then be secured to the fixed flange and the lining sectors 51 axially adjusted relative to the axially inner surface 52 of the inner disk 6. This is done by turning the screws 53 to move the lining sectors against the surface and then turning the screws in the opposite direction for a predetermined number of increments as measured by the balls 57 engaging the corrugations 55 to thereby secure a predetermined clearance. Also, the inner and outer brake shoes 2 and 3 may be axially adjusted with respect to the disks 6 and 7 by means of the adjustment screw 59 and if desired the above ball and corrugation feature may be used to secure the desired measured withdrawal adjustment and predetermined clearance. In the event that the disk brake is for use with a rear wheel of a motor vehicle, the anchor 5 is secured to a suitable axle flange at each rear wheel. It is also apparent that the brake shoes 2 and 3 may be formed of some relatively weak material other than cast iron.

What I claim as my invention is:

1. In a disk brake, a rotatable member having axially spaced disks each provided with a generally radial brake surface in opposed, confronting relation to the radial brake surface of the other, an anchor, a pair of friction members supported on said anchor and movable away from each other into frictional engagement with said respective brake surfaces, a third friction member comprising an arcuate backing having friction lining thereon engageable with the side of one of said disks opposite its brake surface for retarding said rotatable member and limiting axial movement of said one disk and flexing of said rotatable member upon movement of said pair of friction members into engagement with said brake surfaces of said disks, means for mounting said third friction member on said anchor including bosses on said arcuate backing and axial recesses in said anchor receiving said bosses, and means for fixing said bosses in said recesses with said friction lining normally spaced from said side of said one disk.

2. In a disk brake, a rotatable member having axially spaced disks each provided with a generally radial brake surface in opposed, confronting relation to the radial brake surface of the other, an anchor, a pair of friction members supported on said anchor and movable away from each other into frictional engagement with said respective brake surfaces, a third friction member comprising an arcuate backing having friction lining thereon engageable with the side of one of said disks opposite its brake surface for retarding said rotatable member and limiting axial movement of said one disk and flexing of said rotatable member upon movement of said pair of friction members into engagement with said brake surfaces of said disks, means for mounting said third friction member on said anchor in axially adjusted position with its friction lining normally spaced from said side of said one disk including bosses on said arcuate backing and axial recesses in said anchor slidably receiving said bosses, and screws rotatably carried by said anchor and extending into said recesses, said screws threadedly engaging said bosses.

3. In a disk brake, a rotatable member having axially spaced disks each provided with a generally radial brake surface in opposed, confronting relation to the radial brake surface of the other, a pair of friction members supported for movement away from each other into frictional engagement with said respective brake surfaces, a flex limiting member engageable with the side of one of said disks opposite its brake surface for limiting axial movement of said one disk and flexing of said rotatable member upon movement of said pair of friction members into engagement with said brake surfaces of said disks, a fixed support, means mounting said flex limiting member on said support including bosses on said flex limiting member and axial recesses in said support receiving said bosses, and means for fixing said bosses in said recesses with said flex limiting member normally spaced from said side of said one disk.

4. The disk brake defined in claim 3 in which said flex limiting member comprises an arcuate backing having friction lining thereon engageable with said side of said one disk for retarding said rotatable member, said friction lining being normally spaced from said side of said one disk.

References Cited in the file of this patent

UNITED STATES PATENTS

| | | |
|---|---|---|
| 1,608,568 | Shepley | Nov. 30, 1926 |
| 1,927,358 | Breguet | Sept. 19, 1933 |
| 2,043,444 | Musham | June 9, 1936 |
| 2,242,049 | Ash | May 13, 1941 |
| 2,265,938 | Eksergian | Dec. 9, 1941 |
| 2,304,368 | Milan | Dec. 8, 1942 |
| 2,307,652 | Whitten | Jan. 5, 1943 |
| 2,359,516 | Frank | Oct. 3, 1944 |
| 2,552,571 | Mercier | May 15, 1951 |
| 2,639,195 | Bock | May 19, 1953 |
| 2,720,943 | Kershner et al. | Oct. 18, 1955 |
| 2,732,042 | Lucker | Jan. 24, 1956 |
| 2,736,396 | Rasmussen et al. | Feb. 28, 1956 |

FOREIGN PATENTS

| | | |
|---|---|---|
| 1,074,409 | France | Mar. 31, 1954 |
| 713,282 | Germany | Nov. 5, 1941 |
| 689,552 | Great Britain | Apr. 1, 1953 |